United States Patent
Sato (10) Patent No.: US 7,952,649 B2
(45) Date of Patent: May 31, 2011

(54) AV APPARATUS AND METHOD FOR CONTROLLING THE SAME

(75) Inventor: Shojiro Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/431,675

(22) Filed: Apr. 28, 2009

(65) Prior Publication Data

US 2010/0045878 A1    Feb. 25, 2010

(30) Foreign Application Priority Data

Aug. 22, 2008    (JP) .................................. 2008-213673

(51) Int. Cl.
*H04N 5/44* (2011.01)

(52) U.S. Cl. ........................................................ 348/734

(58) Field of Classification Search .................. 348/734, 348/725–729, 552, 553; 340/825.73, 825.25, 340/825.69
See application file for complete search history.

(56) References Cited

U.S. PATENT DOCUMENTS

| | | | |
|---|---|---|---|
| 5,675,395 A * | 10/1997 | Martin et al. .................. | 348/734 |
| 6,219,109 B1 * | 4/2001 | Raynesford et al. .......... | 348/734 |
| 6,346,891 B1 * | 2/2002 | Feinleib et al. ........... | 340/825.69 |
| 6,396,480 B1 * | 5/2002 | Schindler et al. ............. | 345/169 |
| 6,424,285 B1 * | 7/2002 | Perdue et al. .................. | 341/176 |
| 6,476,727 B1 * | 11/2002 | Vogel ....................... | 340/825.69 |
| 6,529,556 B1 * | 3/2003 | Perdue et al. .................. | 375/260 |
| 6,895,252 B2 * | 5/2005 | Pugel ............................. | 455/500 |
| 7,486,189 B2 * | 2/2009 | Koerner et al. ............. | 340/572.1 |
| 7,733,428 B2 * | 6/2010 | Sato ............................... | 348/734 |
| 2008/0151126 A1 * | 6/2008 | Yu ................................. | 348/734 |

FOREIGN PATENT DOCUMENTS

| JP | 4-37399 | 2/1992 |
|---|---|---|
| JP | H05-137179 A | 6/1993 |
| JP | 5-308373 | 11/1993 |
| JP | 2001-346276 | 12/2001 |
| JP | 2001-348936 | 12/2001 |
| JP | 2007-158409 | 6/2007 |

* cited by examiner

*Primary Examiner* — Paulos M Natnael (74) *Attorney, Agent, or Firm* — Knobbe, Martens, Olson & Bear LLP (57) ABSTRACT

According to one embodiment, an AV apparatus is set in an infrared/radio receiving mode, where operation information received by an infrared ray receiving module for receiving operation information transmitted using infrared rays and operation information received by a radio wave receiving module for receiving operation information transmitted using radio waves are accepted, and when operation information is received by the one reception module within a previously set predetermined time from the reception of the operation information by the other receiving module, only the operation information received by the infrared ray receiving module is accepted.

4 Claims, 9 Drawing Sheets

AV APPARATUS AND METHOD FOR CONTROLLING THE SAME

CROSS-REFERENCE TO RELATED APPLICATIONS

This application is based upon and claims the benefit of priority from Japanese Patent Application No. 2008-213673, filed Aug. 22, 2008, the entire contents of which are incorporated herein by reference.

BACKGROUND

1. Field

One embodiment of the invention relates to an improvement of an AV (audio visual) apparatus, which is wirelessly operated by a remote controller, and a method for controlling the AV apparatus.

2. Description of the Related Art

As is well known, usually, to control an AV apparatus, as represented by an optical disk reproducing apparatus for reproducing an optical disk such as a DVD (digital versatile disk), a user wirelessly transmits operation information with the use of a remote controller, whereby the AV apparatus can be remotely controlled so as to be in a stopped state, or various other states.

Generally, in such home-use AV apparatus, there are basically two types of media used for wirelessly transmitting operation information from a remote controller to the AV apparatus; infrared rays and radio waves.

In the infrared ray type, the operation information should be transmitted while directing the remote controller to the AV apparatus in such a state that there is no obstacle blocking infrared rays on the line connecting the remote controller with the AV apparatus; however, it is possible to ensure compatibility with remote controllers for other infrared ray type AV apparatus.

Meanwhile, the radio wave type is used in the bidirectional communication between the remote controller and the AV apparatus, and even if there is an obstacle on the line connecting the remote controller with the AV apparatus, the operation information can be transmitted to the AV apparatus, and, at the same time, information can be transmitted from the AV apparatus to the remote controller.

Currently, there has emerged a type of AV apparatus which can be operated by a remote controller adopting both the infrared ray method and the radio wave method. This type of remote controller has an infrared ray exclusive mode where the operation information is transmitted using only infrared rays, a radio wave exclusive mode where the operation information is transmitted using only radio waves, and an infrared/radio (dual) mode where the operation information is transmitted using infrared rays and radio waves. Each mode can be set by a user.

The AV apparatus receiving the operation information from the above remote controllers has a function of receiving the operation information transmitted using infrared rays and a function of receiving the operation information transmitted using radio waves, and can correspond to operate in accordance with the operation information received by both of these functions.

As described above, the infrared-type remote controller is compatible with infrared remote controllers used for another AV apparatus. Namely, the AV apparatus having a function of receiving both of infrared rays and radio waves is controlled by not only the operation information transmitted through infrared rays or radio waves from the provided remote controller, but also the operation information transmitted through infrared rays from a remote controller used for another AV apparatus.

Therefore, in this type of AV apparatus, it has been strongly expected to take measures for preventing the occurrence of situations undesired for users when the operation information transmitted through infrared rays or radio waves from the provided remote controller is received at substantially the same time as the operation information transmitted through infrared rays from the remote controller for other AV apparatuses, and, in addition, when the content of these pieces of operation information differ from each other.

In Jpn. Pat. Appln. KOKAI Publication No. 5-137179, in the remote controller which can control various apparatuses by either of infrared or UHF remote control signals, when a leader code is detected from the UHF remote control signal, the signal path of the infrared remote control signal is cut off, and the control of the apparatus is performed only by the UHF remote control signal, whereby malfunction is prevented.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an AV apparatus is set in an infrared/radio receiving mode, where operation information received by an infrared ray receiving module for receiving operation information transmitted using infrared rays and operation information received by a radio wave receiving module for receiving operation information transmitted using radio waves are accepted, and when operation information is received by the one reception module within a previously set predetermined time from the reception of the operation information by the other receiving module, only the operation information received by the infrared ray receiving module is accepted.

Figure 1:
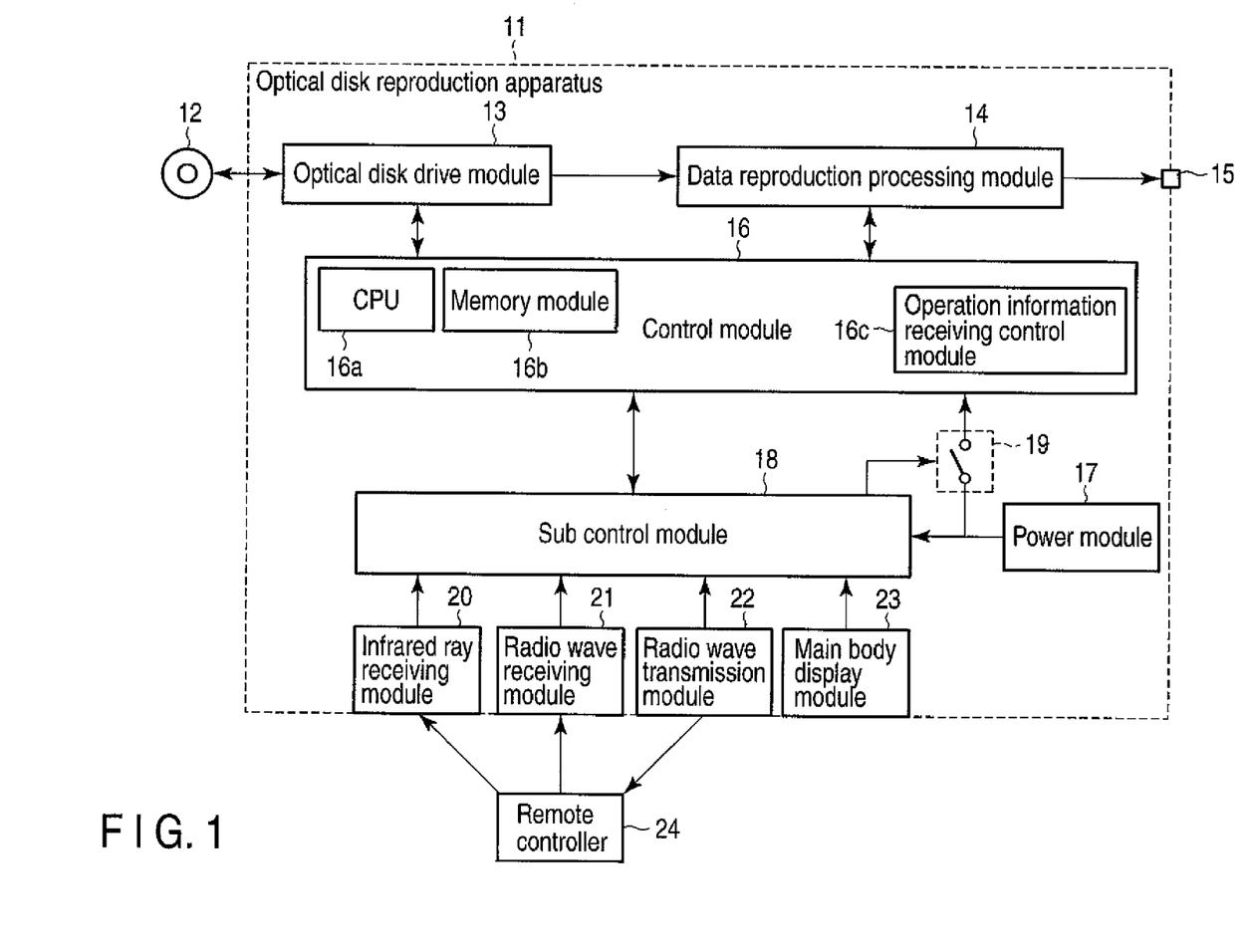
FIG. 1 is a block configuration diagram showing an embodiment of the invention and for explaining a main signal processing system of an optical disk reproducing apparatus.

FIG. 1 shows a main signal processing system in an optical disk reproducing apparatus 11 as the AV apparatus to be described in this embodiment. An optical disk 12, such as a DVD, can be removably loaded in the optical disk reproducing apparatus 11. The optical disk reproducing apparatus 11 is provided with an optical disk drive module 13 reading data recorded in the loaded optical disk 12.

The data read from the optical disk 12 by the optical disk drive module 13 is then supplied to a data reproduction processing module 14, to be subjected a predetermined data reproduction processing, to be thereby decoded into, for example, an analog video signal and an analog audio signal, and, thus, to be taken out to the outside through an output terminal 15.

In this embodiment, the overall operation of the optical disk reproducing apparatus 11, including the reproducing operation in the optical disk 12, is controlled by a control module 16. The control module 16 has a built in CPU (central processing unit) 16a, receives operation information transmitted from a remote controller 24 attached to the optical disk reproducing apparatus 11, and controls each module so that the operation content in the operation information is reflected.

In the above case, the control module 16 utilizes a memory module 16b. The memory module 16b mainly has a ROM (read only memory) in which a control program executed by the CPU 16a is stored, a RAM (random access memory) providing a working area for the CPU 16a, and a nonvolatile memory in which various setting information, control information, and so on are stored.

On the basis of the control by a sub control module 18 which is always supplied with electric power from a power module 17 and thus is in a starting state, an energization switch 19 is turned on, whereby the electric power is supplied from the power module 17 to the control module 16, and thus the control module 16 enters the starting state. According to this constitution, the control module 16 is in a state in which control is performed so that the reproducing operation of the optical disk 12 is performed.

The sub control module 18 is connected to an infrared ray receiving module 20, a radio wave receiving module 21, a radio wave transmission module 22, and a main body display module 23. The infrared ray receiving module 20 receives the operation information transmitted from a remote controller 24 through infrared rays as a transmission medium and operates so as to supply the received operation information to the sub control module 18. The radio wave receiving module 21 receives the operation information transmitted from a remote controller 24 through radio waves as the transmission medium and operates so as to supply the received operation information to the sub control module 18.

When the operation information obtained from the infrared ray receiving module 20 and the radio wave receiving module 21 includes the content requesting the turning on of the power source, the sub control module 18 controls the energization switch 19 to an ON state and operates so as to supply the electric power from the power module 17 to the control module 16. When the energization switch 19 is in the ON state, the sub control module 18 supplies the operation information, obtained from the infrared ray receiving module 20 and the radio wave receiving module 21, to the control module 16. According to this constitution, the control module 16 receiving the operation information from the remote controller 24 can control each module so that the operation content in the operation information is reflected.

When the operation information obtained from the infrared ray receiving module 20 and the radio wave receiving module 21 includes the content requesting the turning off of the power source, the sub control module 18 controls the energization switch 19 to an OFF state and operates so that the electric power from the power module 17 is not supplied to the control module 16.

When information to be transmitted to the remote controller 24 is generated in at least one of the control module 16 and the sub control module 18, the radio wave transmission module 22 operates so as to transmit the information to the remote controller 24 through radio waves. Further, when information to be displayed outside is generated in at least one of the control module 16 and the sub control module 18, the main body display module 23 operates so as to display the information.

In this embodiment, the control module 16 is provided with an operation information receiving control module 16c. The operation information is received by the infrared ray receiving module 20, and thereafter when the operation information is received by the radio wave receiving module 21 within a previously set predetermined time, the operation information receiving control module 16c, the details of which will be described later, performs control so that the operation information transmitted through infrared rays is accepted and so that the operation information transmitted through radio waves is not accepted.

Further, the operation information is received by the radio wave receiving module 21, and thereafter when the operation information is received by the infrared ray receiving module 20 within a previously set predetermined time, the operation information receiving control module 16c performs control so that the operation information transmitted through infrared rays is accepted and so that the operation information transmitted through radio waves is not accepted.

Namely, when the operation information transmitted through infrared rays and the operation information transmitted through radio waves are received out of sequence within a previously set predetermined time, the operation information receiving control module 16c performs control so that the operation information transmitted through infrared rays is preferentially accepted.

According to the above constitution, in the optical disk reproducing apparatus 11, when the operation information transmitted through radio waves from the provided remote controller 24 is received at substantially the same time as the operation information transmitted through infrared rays from a remote controller (not shown) used for another AV apparatus, and, in addition, when the content of these pieces of operation information differ, it is possible to prevent the occurrence of a malfunction.

For example, let us consider the case where one user operates a reproduction key of a remote controller used for other AV equipment (by this operation, the operation information indicating that the optical disk 12 should be played is transmitted by infrared rays) and another user mistakenly operates the stop key of the remote controller 24 attached to the optical disk reproducing apparatus 11 (by this operation, the operation information indicating that the play operation should be stopped is transmitted by radio waves). In this case, the optical disk reproducing apparatus 11 performs the reproducing operation but immediately stops. This is undesirable to the user who wants to reproduce the optical disk 12.

However, when the operation information transmitted through infrared rays and the operation information transmitted through radio waves are received out of sequence within a previously set predetermined time, the operation information transmitted through infrared rays is preferentially accepted by the control by the operation information receiving control module 16c; therefore, the operation information transmitted through radio waves is ignored, and the optical disk 12 can be reproduced in the optical disk reproducing apparatus 11.

Here, the reason why the optical disk reproducing apparatus 11 accepts the operation information transmitted through infrared rays in preference to the operation information transmitted through radio waves is described. Namely, a user directs a remote controller (including ones attached to the optical disk reproducing apparatus 11 and another AV apparatus) to the optical disk reproducing apparatus 11 and operates a key of the remote controller, whereby the operation information transmitted through infrared rays is transmitted to be received by the optical disk reproducing apparatus 11.

Meanwhile, the operation information based on radio waves is transmitted and received by the optical disk reproducing apparatus 11 regardless of the direction of the remote controller, when the user merely operates the key of the remote controller. Namely, this is because, compared with the case of the operation information transmitted through radio waves, there is a high possibility that a user operates the remote controller with clear intent to control the optical disk reproducing apparatus 11, whereby the operation information transmitted through infrared rays is received by the optical disk reproducing apparatus 11.

In this embodiment, when a time difference between a time of receiving the operation information transmitted through infrared rays and a time of receiving the operation transmitted through radio waves is within a previously set predetermined time, the operation information receiving control module 16c operates to preferentially accept the operation information transmitted through infrared rays. The previously set predetermined time is appropriately, for example, about 0.1 to 1 second.

Namely, when the remote controller 24 is set to an infrared/radio mode where the operation information is transmitted simultaneously using infrared rays and radio waves, even if the content of the operation information simultaneously transmitted respectively through infrared rays and radio waves from the remote controller 24 is the same, in the optical disk reproducing apparatus 11 a time lag occurs between the time of receiving the operation information transmitted through infrared rays and the time of receiving the operation information transmitted through radio waves.

Therefore, when the optical disk reproducing apparatus 11 receives the operation information transmitted through infrared rays prior to the operation information transmitted through radio waves, if the operation information of the same content is received through radio waves within a previously set predetermined time (for example, 0.1 to 1 second) from the time of receiving the operation information transmitted through infrared rays, it is determined that the remote controller 24 is set in the infrared/radio mode, and the optical disk reproducing apparatus 11 responds to the operation information transmitted through radio waves.

On the other hand, when the optical disk reproducing apparatus 11 receives the operation information transmitted through radio waves prior to the operation information transmitted through infrared rays, if the operation information of the same content is received through infrared rays within the above previously set predetermined time from the time of receiving the operation information transmitted through radio waves, it is determined that the remote controller 24 is set in the infrared/radio mode, and the optical disk reproducing apparatus 11 responds to the operation information transmitted through infrared rays.

Thus, it is at least considered that in the optical disk reproducing apparatus 11, a predetermined time (for example, 0.1 to 1 second) previously set for determining that the remote controller 24 is set in the infrared/radio mode is a predetermined time set for operating so that the operation information receiving control module 16c preferentially accepts the operation information transmitted through infrared rays. According to this constitution, it is possible to avoid the occurrence of an undesirable situation for users in which the operation information transmitted through one means differs in content from, and is received substantially simultaneously with, the operation information transmitted through another means.

Incidentally, even when the optical disk reproducing apparatus 11 is in such a state of preferentially accepting the operation information transmitted through infrared rays, the operation information transmitted through radio waves is received by the radio wave receiving module 21, and the content of the operation information transmitted through radio waves is discriminated by the control module 16. Therefore, no inconvenience occurs in the judgment of whether or not the remote controller 24 is set in the infrared/radio mode.

Figure 2:
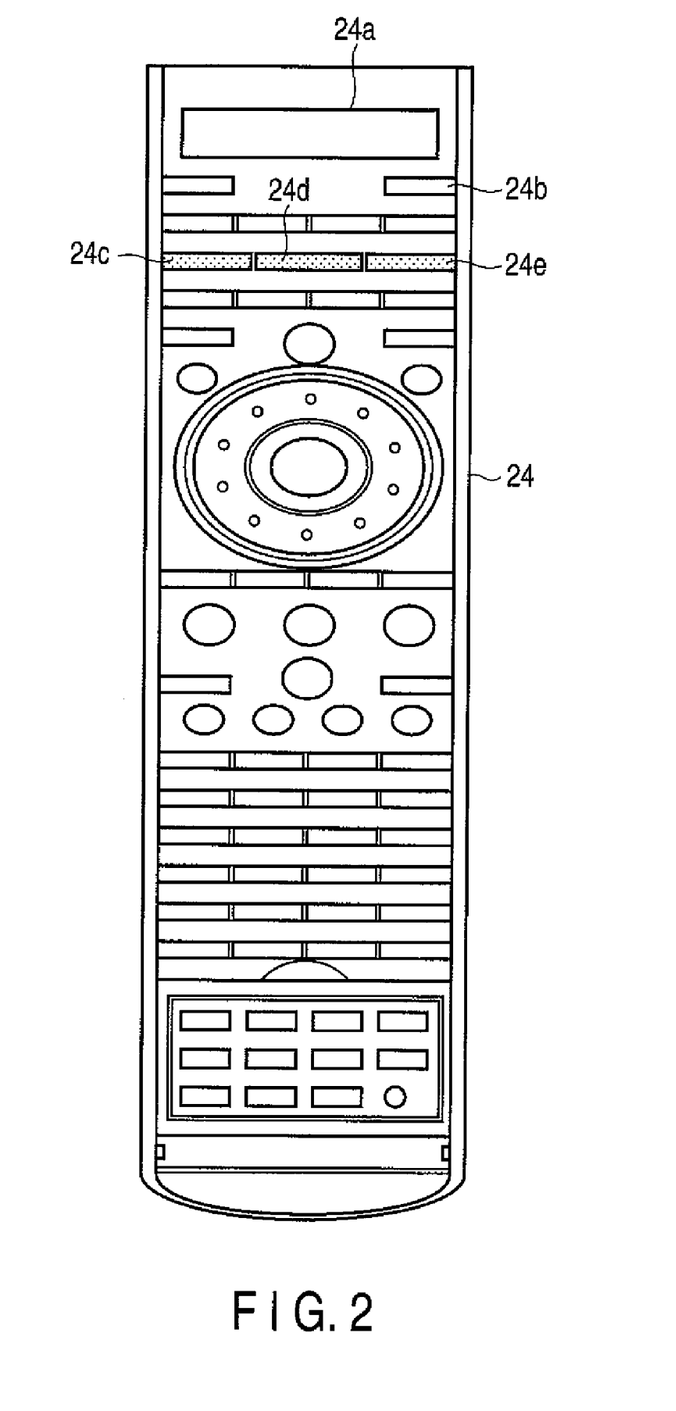
FIG. 2 is an external view for explaining a remote controller of the optical disk reproducing apparatus in the same embodiment.

FIG. 2 shows the appearance of the remote controller 24. The remote controller 24 has various operation keys. A user operates the operation keys to thereby remotely operate the optical disk reproducing apparatus 11 so that the optical disk reproducing apparatus 11 is in various operating states or a stopped state. As main components of this embodiment, there are a liquid crystal display module 24a, a power key 24b, an infrared ray exclusive mode key 24c, a radio wave exclusive mode key 24d, and an infrared/radio mode key 24e.

The power key 24b requires the turning on and off of the power source to the optical disk reproducing apparatus 11. Namely, the power key 24b generates the operation information requiring the turning on and off of the energization switch 19. The infrared ray exclusive mode key 24c sets the remote controller 24 in an infrared ray exclusive mode where the operation information is transmitted by using only infrared rays.

The radio wave exclusive mode key 24d sets the remote controller 24 in a radio wave exclusive mode where the operation information is transmitted by using only radio waves. The infrared/radio mode key 24e sets the remote controller 24 in an infrared/radio mode where the operation information transmitted using infrared rays is transmitted at substantially the same time as the operation information transmitted using radio waves.

The liquid crystal display module 24a displays the information transmitted through radio waves from the optical disk reproducing apparatus 11 to the remote controller 24 and the internal state of the remote controller 24. For example, when the operation information is transmitted through infrared rays from the remote controller 24, a message "IR" is displayed in the liquid crystal display module 24a. When the operation information is transmitted through radio waves from the remote controller 24, a message "RF" is displayed in the liquid crystal display module 24a. When the operation information is transmitted through both of infrared rays and radio waves from the remote controller 24, a message "IR•RF" is displayed in the liquid crystal display module 24a.

Figure 3:
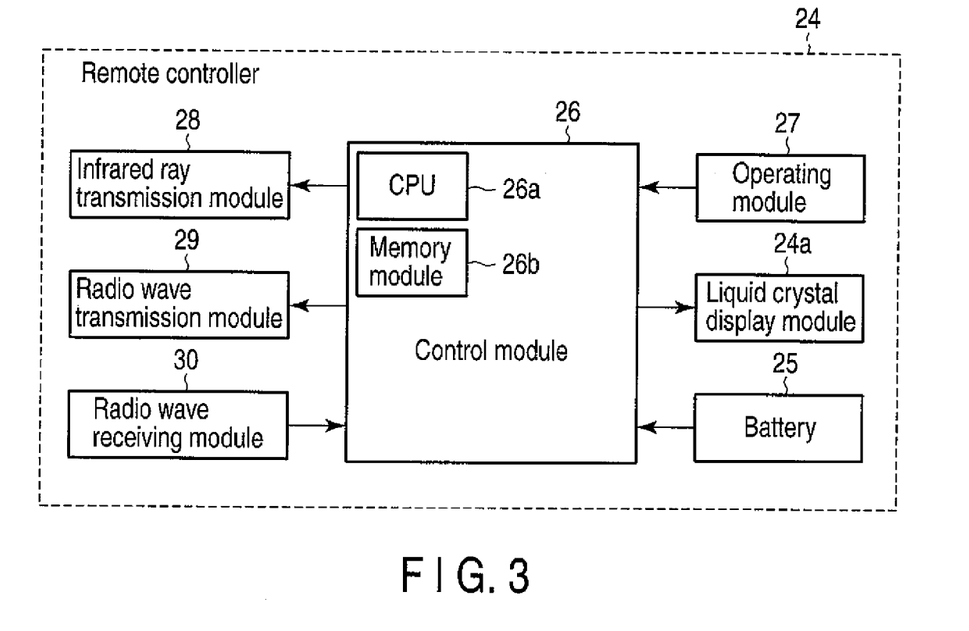
FIG. 3 is a block configuration diagram for explaining a main signal processing system of the remote controller in the same embodiment.

FIG. 3 shows a main signal processing system of the remote controller 24. The remote controller 24 is provided with a control module 26 which receives electric power from a battery 25 to enter a starting state. The control module 26 is provided with a CPU 26a and a memory module 26b used by the CPU 26a, and controls the overall operation of the remote controller 24.

Namely, the control module 26 receives the operation information from an operation module 27 which is collectively comprised of various operation keys provided on the remote controller 24, and performs control so that the operation information is transmitted from either or both of an infrared ray transmission module 28 and a radio wave transmission module 29. In addition, the control module 26 performs control so that the internal state of the remote controller 24, the information received by a radio wave receiving module 30, and so on are displayed in the liquid crystal display module 24a.

Figure 4:
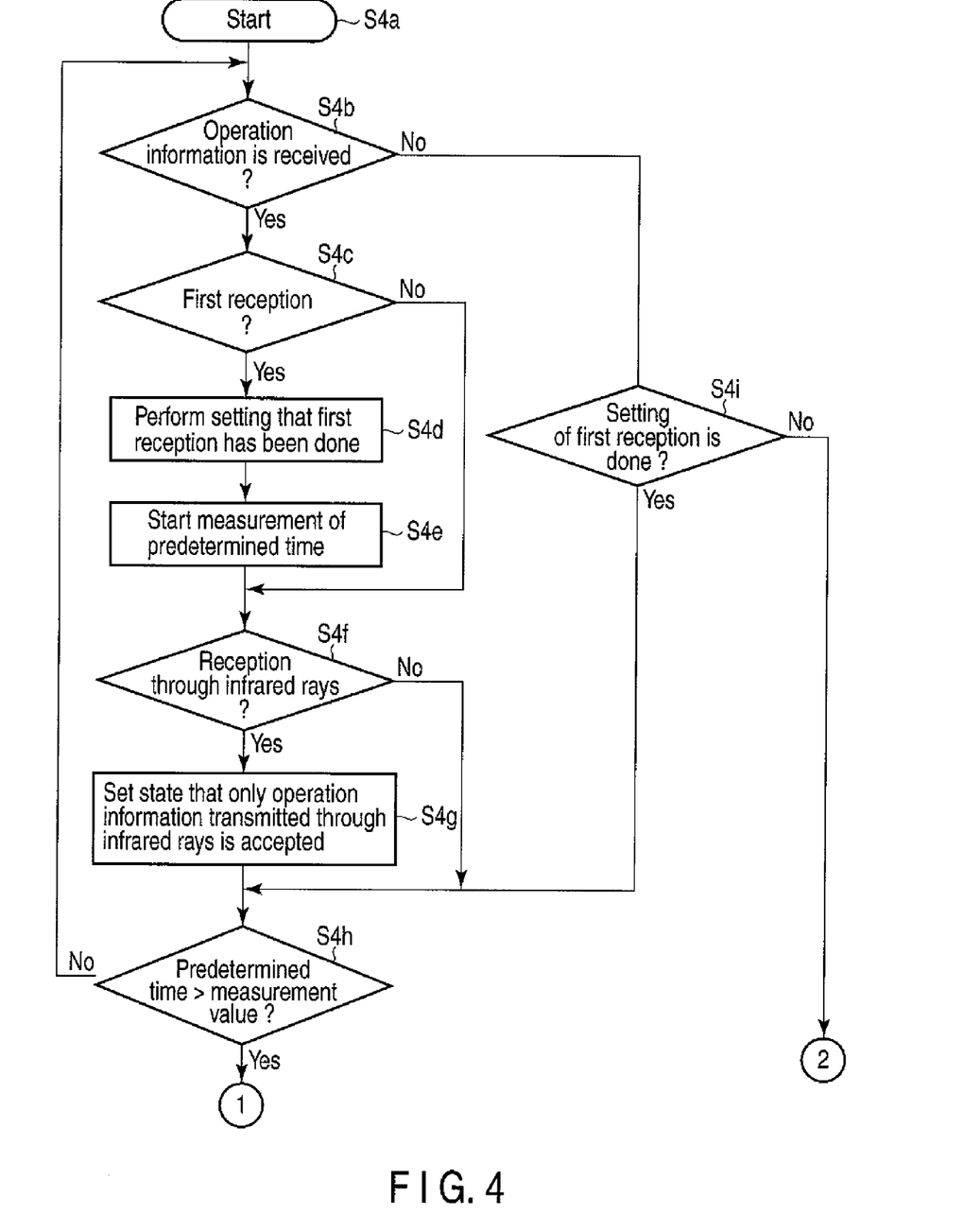
FIG. 4 is a flow chart for explaining a part of a main processing operation performed by the optical disk reproducing apparatus in the same embodiment.
Figure 5:
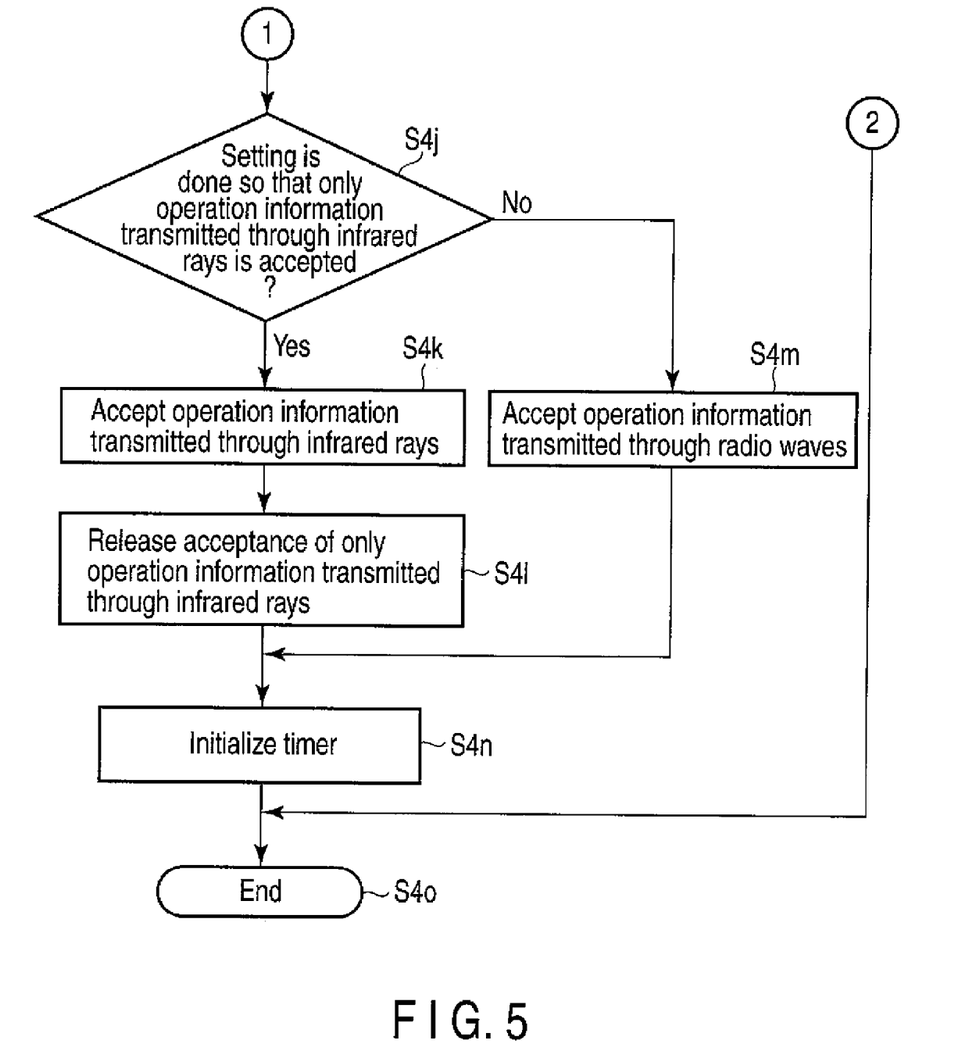
FIG. 5 is a flow chart for explaining the remaining part of the main processing operation performed by the optical disk reproducing apparatus in the same embodiment.

FIGS. 4 and 5 are flow charts summarizing a processing operation in the operation information receiving control module 16c. When the processing is started in such a state that the energization switch 19 is turned on (step S4a), the operation information receiving control module 16c discriminates whether or not the operation information from either remote controller (including remote controllers attached to the optical disk reproducing apparatus 11 and another AV apparatus) is received through at least one of infrared rays and radio waves (step S4b).

When it is determined that the operation information is received (step S4b:YES), the operation information receiving control module 16c discriminates whether or not the reception is the first time (step S4c). When it is determined that it is the first time (YES), the setting that the first reception has been done is performed (step S4d). Thereafter, the operation information receiving control module 16c starts the measurement of a previously set predetermined time with the use of a built in timer (not shown) (step S4e).

After step S4e, or when it is determined that the reception is not the first time (step S4c:NO), the operation information receiving control module 16c discriminates whether or not the operation information is received through infrared rays (step S4f). When it is determined that the operation information is received through infrared rays (YES), the operation information receiving control module 16c sets the optical disk reproducing apparatus 11 in such a state of accepting only the operation information transmitted through infrared rays (step S4g).

After step S4g, or when it is determined that the operation information is not received through infrared rays (step S4f: NO), the operation information receiving control module 16c discriminates whether or not the value measured using the timer exceeds a predetermined time (for example, 0.5 second) (step S4h). When it is determined that the value does not exceed the predetermined time (NO), the processing returns to step S4b.

When it is determined that the operation information is not received (step S4b:NO), the operation information receiving control module 16c discriminates whether or not the setting that the first reception has been done is done (step S4i). When it is determined that the setting is done (YES), the processing proceeds to step S4h. When it is determined that the setting is not done (NO), the processing is terminated (step S4o).

When it is determined that the value measured using the timer exceeds the predetermined time (step S4h:YES), the operation information receiving control module 16c discriminates whether or not the optical disk reproducing apparatus 11 is set in such a state of accepting only the operation information transmitted through infrared rays (step S4j). When it is determined that the optical disk reproducing apparatus 11 is set in such a state (YES), the operation information transmitted through infrared rays is accepted (step S4k), and thereafter, the state that only the operation information transmitted through infrared rays is accepted is released (step S4l).

When it is determined that the optical disk reproducing apparatus 11 is not set in such a state of accepting only the operation information transmitted through infrared rays (step S4j: NO), the operation information receiving control module 16c accepts the reception of the operation information transmitted through radio waves (step S4m). After step S4l or step S4m, the operation information receiving control module 16c initializes the value measured using the timer (step S4n), and then the processing is terminated (step S4o).

Figure 6:
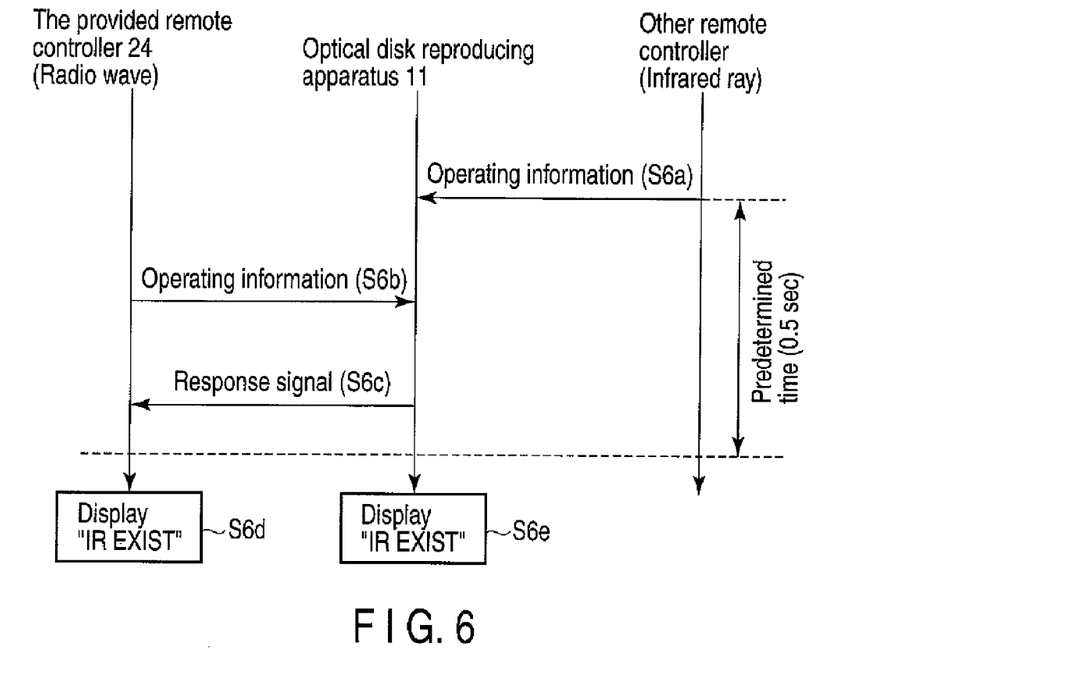
FIG. 6 is a view for explaining an example of an operation sequence performed by the optical disk reproducing apparatus and the remote controller in the same embodiment.

FIG. 6 shows an example of an operation sequence performed by the optical disk reproducing apparatus 11, the remote controller 24 attached to the optical disk reproducing apparatus 11, and a remote controller used for another AV apparatus, on the basis of the above flow chart.

It is assumed that the operation information transmitted through infrared rays from the remote controller for another AV apparatus is received by the optical disk reproducing apparatus 11 (step S6a), and the operation information transmitted through radio waves from the provided remote controller 24 is received by the optical disk reproducing apparatus 11 within a previously set predetermined time (for example, 0.5 second) from the time of receiving the operation information transmitted through infrared rays (step S6b).

Then, in the optical disk reproducing apparatus 11, a response signal is transmitted to the remote controller 24 through radio waves (step S6c). The response signal shows that the setting is performed so that only the operation information transmitted through infrared rays is accepted, and the operation information transmitted through radio waves is not accepted. According to this, the remote controller 24 displays a message "IR EXIST" in the liquid crystal display module 24a (step S6d). The message "IR EXIST" shows that the optical disk reproducing apparatus 11 is in a state of being controlled by the operation information transmitted through infrared rays from the remote controller for another AV apparatus. Namely, the remote controller 24 indicates to a user that the operation information transmitted by itself through radio waves has not been accepted.

In addition, in the optical disk reproducing apparatus 11, the message "IR EXIST" is displayed in the main body display module 23 (step S6e), the message "IR EXIST" showing that the optical disk reproducing apparatus 11 is in a state of being controlled by not the operation information from the provided remote controller 24, but the operation information transmitted through infrared rays from the remote controller for another AV apparatus. Namely, the optical disk reproducing apparatus 11 indicates to a user that the operation information transmitted through radio waves has not been accepted.

Figure 7:
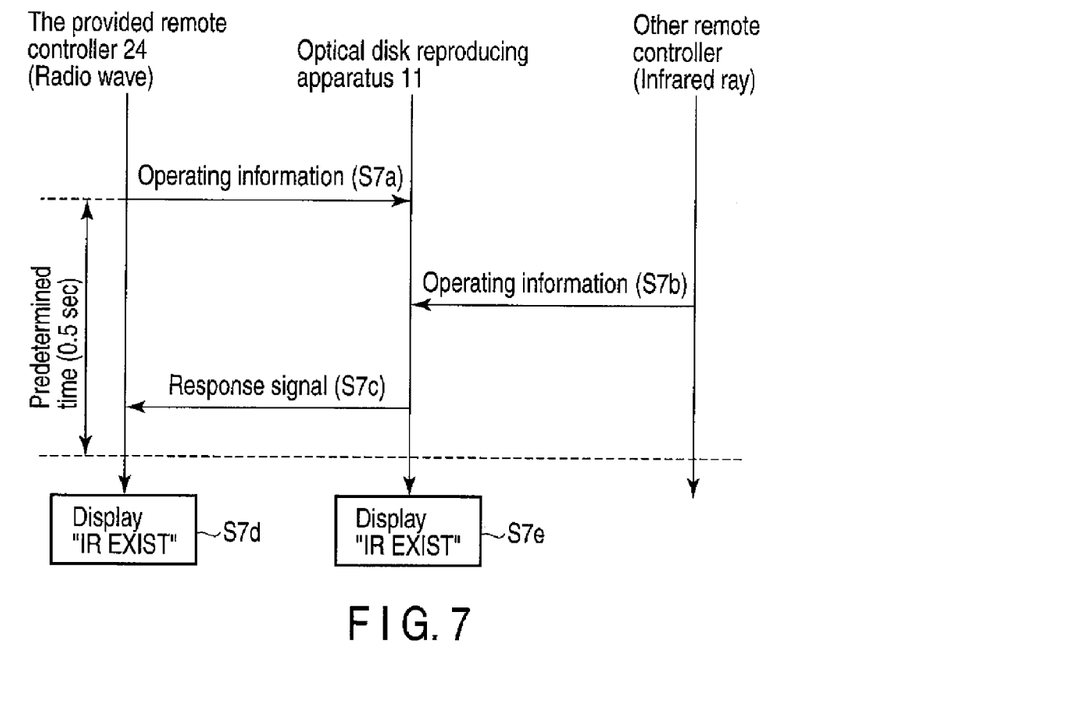
FIG. 7 is a view for explaining another example of the operation sequence performed by the optical disk reproducing apparatus and the remote controller in the same embodiment.

FIG. 7 shows another example of the operation sequence performed by the optical disk reproducing apparatus 11, the remote controller 24 attached to the optical disk reproducing apparatus 11, and a remote controller used for another AV apparatus, on the basis of the flow charts of FIGS. 4 and 5.

It is assumed that the operation information transmitted through radio waves from the provided remote controller 24 is received by the optical disk reproducing apparatus 11 (step S7a), and the operation information transmitted through infrared rays from the remote controller for another AV apparatus is received by the optical disk reproducing apparatus 11 within a previously set predetermined time (for example, 0.5 second) from the time of receiving the operation information transmitted through radio waves from the remote controller 24 (step S7b).

In the optical disk reproducing apparatus 11, a response signal is transmitted through radio waves to the remote controller 24 (step S7c). The response signal shows that the setting is performed so that only the operation information transmitted through infrared rays is accepted, and the operation information transmitted through radio waves is not accepted. Accordingly, the remote controller 24 displays the message "IR EXIST" in the liquid crystal display module 24a (step S7d). The message "IR EXIST" shows that the optical disk reproducing apparatus 11 is in a state of being controlled by the operation information transmitted through infrared rays from the remote controller for another AV apparatus. Namely, the remote controller 24 indicates to a user that the operation information transmitted by itself through radio waves has not been accepted.

In addition, in the optical disk reproducing apparatus 11, the message "IR EXIST" is displayed in the main body display module 23 (step S7e), the message "IR EXIST" showing that the optical disk reproducing apparatus 11 is in a state of being controlled by not the operation information from the provided remote controller 24, but the operation information transmitted through infrared rays from the remote controller for another AV apparatus. Namely, the optical disk reproducing apparatus 11 indicates to a user that the operation information transmitted through radio waves has not been accepted.

In the above embodiment, when the time difference between the time of receiving the operation information transmitted through infrared rays and the time of receiving the operation transmitted through radio waves is within a previously set predetermined time, the operation information transmitted through infrared rays is preferentially accepted. However, it is not limited thereto, and for example when the time difference between the time of receiving the operation information transmitted through infrared rays and the time of receiving the operation information transmitted through radio waves is within the previously set predetermined time, and, in addition, when these pieces of operation information from each other in content, the operation information transmitted through infrared rays may be preferentially accepted.

In the above embodiment, the case in which the optical disk reproducing apparatus 11 is set in the infrared/radio (dual) receiving mode where both the operation information transmitted through infrared rays and the operation information transmitted through radio waves are received; however, there some AV apparatuses (in this case, the optical disk reproducing apparatus 11) which can be selectively set in an infrared ray reception exclusive mode, where only the operation information transmitted through infrared rays is accepted, and a radio wave reception exclusive mode, where only the operation information transmitted through radio waves is accepted, by a user operating a remote controller.

In such an optical disk reproducing apparatus 11, when the optical disk reproducing apparatus 11 is set in the radio wave reception exclusive mode, if a user has only an infrared remote controller at hand, the user cannot operate the optical disk reproducing apparatus 11, and a situation undesired for the user may occur. Thus, in this embodiment, a power key of the infrared remote controller is continued to be operated for not less than 3 seconds, whereby the radio wave reception exclusive mode can be released, leading to realizing convenient handling for users.

Figure 8:
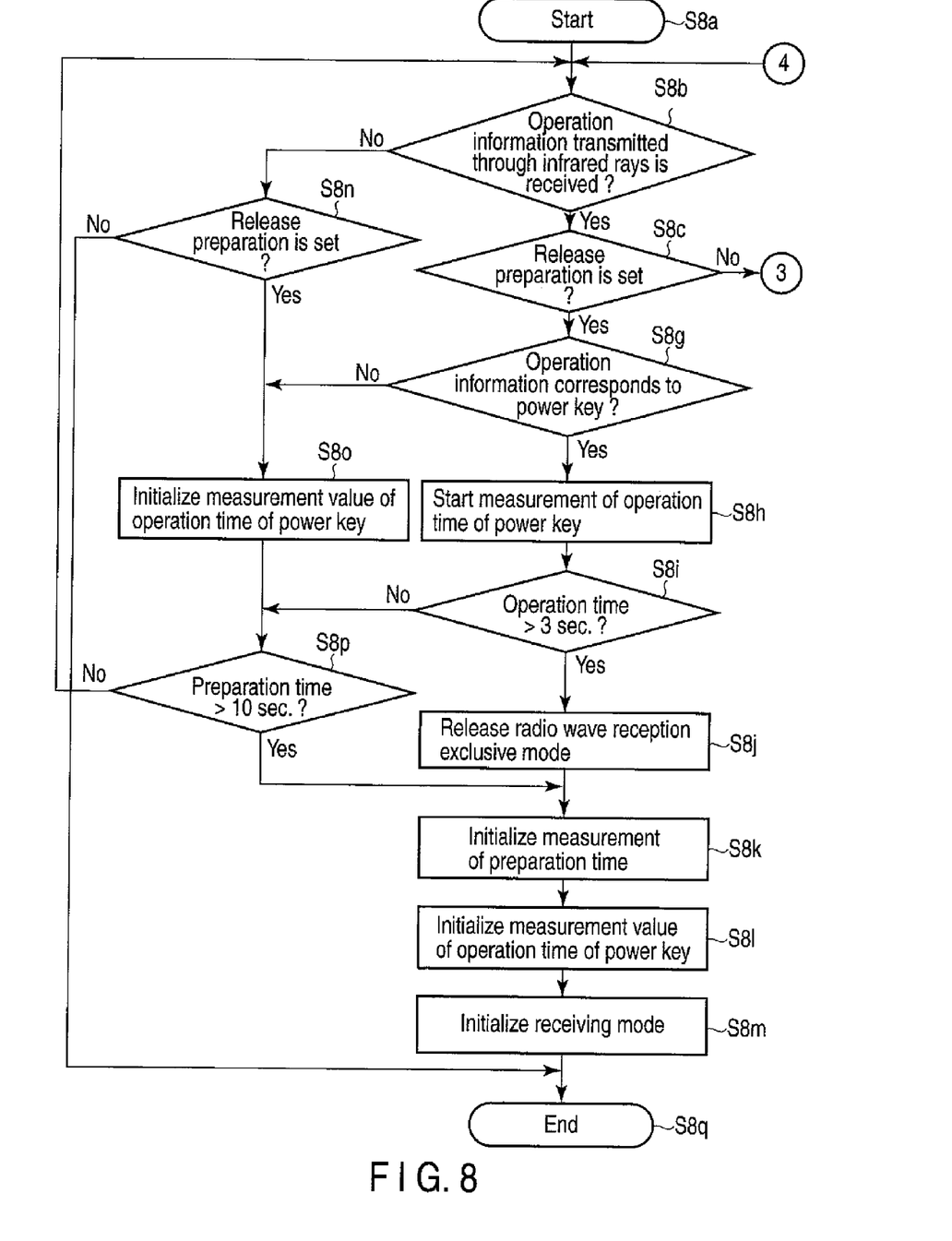
FIG. 8 is a flow chart for explaining a part of another processing operation performed by the optical disk reproducing apparatus in the same embodiment.
Figure 9:
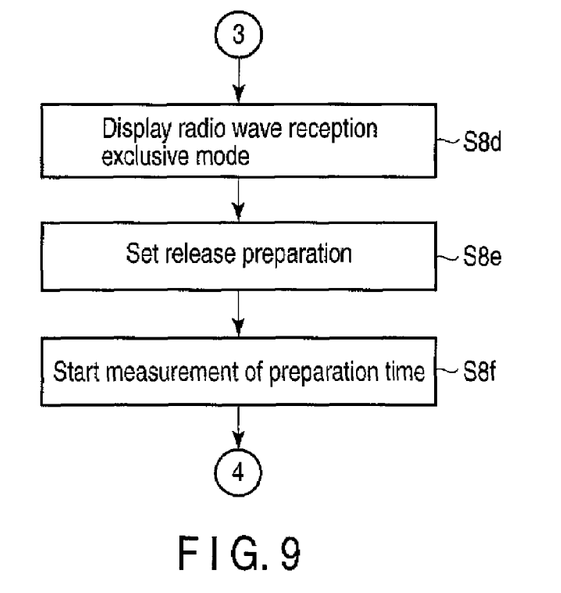
FIG. 9 is a flow chart for explaining the remaining part of the other processing operation performed by the optical disk reproducing apparatus in the same embodiment.

FIGS. 8 and 9 are flow charts of summarizing a processing operation for releasing the radio wave reception exclusive mode, set in the optical disk reproducing apparatus 11, with the use of an infrared remote controller. When the processing is started in such a state that the optical disk reproducing apparatus 11 is set in the radio wave reception exclusive mode (step S8a), the control module 16 discriminates whether or not the operation information transmitted through infrared rays is received (step S8b).

When it is determined that the operation information transmitted through infrared rays is received (step S8b:YES), the control module 16 discriminates whether or not a preparation for releasing the radio wave reception exclusive mode is set (step S8c). When it is determined that the preparation is not set (NO), a message showing that the optical disk reproducing apparatus 11 is set in the radio wave reception exclusive mode is displayed in the main body display module 23 (step S8d), and the preparation for releasing the radio wave reception exclusive mode is set (step S8e). Thereafter, the measurement of a preparation time for releasing the radio wave reception exclusive mode is started by using a built in timer (not shown) (step S8f), and the processing returns to step S8b.

When it is determined that the preparation for releasing the radio wave reception exclusive mode is set (step S8c:YES), the control module 16 discriminates whether or not the operation information received through infrared rays corresponds to the power key of the remote controller (step S8g). When it is determined that the operation information corresponds to the power key (YES), the measurement of a time for which the operation information corresponding to the power key is obtained, that is, a time for which the power key is continued to be operated, is started by using a built in timer (not shown) (step S8h).

The control module 16 then discriminates whether or not the time for which the power key is continued to be operated exceeds 3 seconds (step S8i). When it is determined that the time exceeds 3 seconds (YES), the radio wave reception exclusive mode is released (step S8j).

Thereafter, the control module 16 initializes the value measured by the timer measuring the preparation time for releasing the radio wave reception exclusive mode (step S8k), and initializes the value measured by the timer measuring the time for which the power key of the remote controller is continued to be operated (step S8l). Thereafter, the control module 16 initializes a receiving mode, that is, sets the optical disk reproducing apparatus 11 in the infrared/radio receiving mode where the operation information respectively transmitted through both of infrared rays and radio waves are accepted (step S8m), and then the processing is terminated (step S8q).

When it is determined that the operation information transmitted through infrared rays is not received (step S8b:NO), the control module 16 discriminates whether or not the preparation for releasing the radio wave reception exclusive mode is set (step S8n). When it is determined that the preparation is not set (NO), the processing is terminated (step S8q).

Meanwhile, when it is determined that the preparation for releasing the radio wave reception exclusive mode is set (step S8n:YES), or when it is determined that the operation information transmitted through infrared rays does not correspond to the power key (step S8g:NO), the control module 16 initializes the value measured by the timer measuring the time for which the power key of the remote controller is continued to be operated (step S8o).

After step S8o, or when it is determined that the power key is continued to be operated for not more than 3 seconds (step S8i:NO), the control module 16 discriminates whether or not the preparation time for releasing the radio wave reception exclusive mode exceeds 10 seconds (step S8p). When it is determined that the preparation time exceeds 10 seconds (YES), the processing proceeds to step S8k. When it is determined that the preparation time does not exceed 10 seconds (NO), the processing returns to step S8b.

Figure 10:
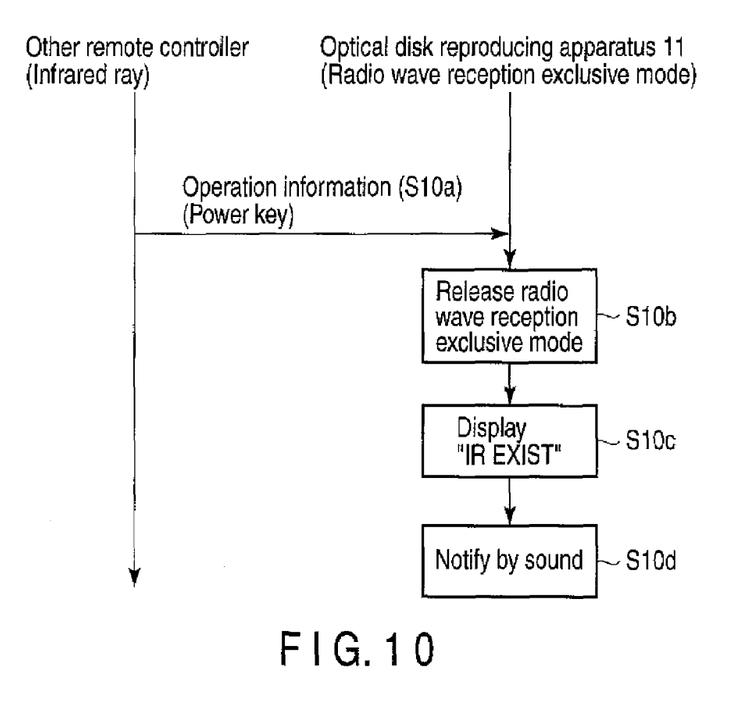
FIG. 10 is a view for explaining another example of the operation sequence performed by the optical disk reproducing apparatus and the remote controller in the same embodiment.

FIG. 10 shows an example of the operation sequence performed by the optical disk reproducing apparatus 11 and a remote controller used for, for example, another AV apparatus, on the basis of the above flow chart. The operation information corresponding to the power key of the remote controller is transmitted through infrared rays from the remote controller to be received for not less than 3 seconds by the optical disk reproducing apparatus 11 set in the radio wave reception exclusive mode (step S10a), and the radio wave reception exclusive mode in the optical disk reproducing apparatus 11 is released (step S10b).

The optical disk reproducing apparatus 11 displays a message "IR EXIST" in the main body display module 23 (step S10c). The message "IR EXIST" shows that the optical disk reproducing apparatus 11 is in a state of being controlled by the operation information transmitted through infrared rays from the remote controller for another AV apparatus. Further, the optical disk reproducing apparatus 11 indicates to a user that the radio wave reception exclusive mode has been released with the use of sound (step S10d).

In the optical disk reproducing apparatus 11, when the operation information is received through infrared rays in such a state that the optical disk reproducing apparatus 11 is set in the radio wave reception exclusive mode through infrared rays, a message for releasing the radio wave reception exclusive mode, such as a message "please press the power key of the infrared remote controller for not less than 3 seconds", is displayed in the main body display module 23, whereby it is more convenient for users.

On the other hand, if there is an object between the optical disk reproducing apparatus 11 set in the infrared ray reception exclusive mode and the remote controller, and if the operation information transmitted through infrared rays is unlikely to be received by the optical disk reproducing apparatus 11, it is necessary to release the infrared ray reception exclusive mode set in the optical disk reproducing apparatus 11 by using the operation information transmitted through radio waves.

Figure 11:
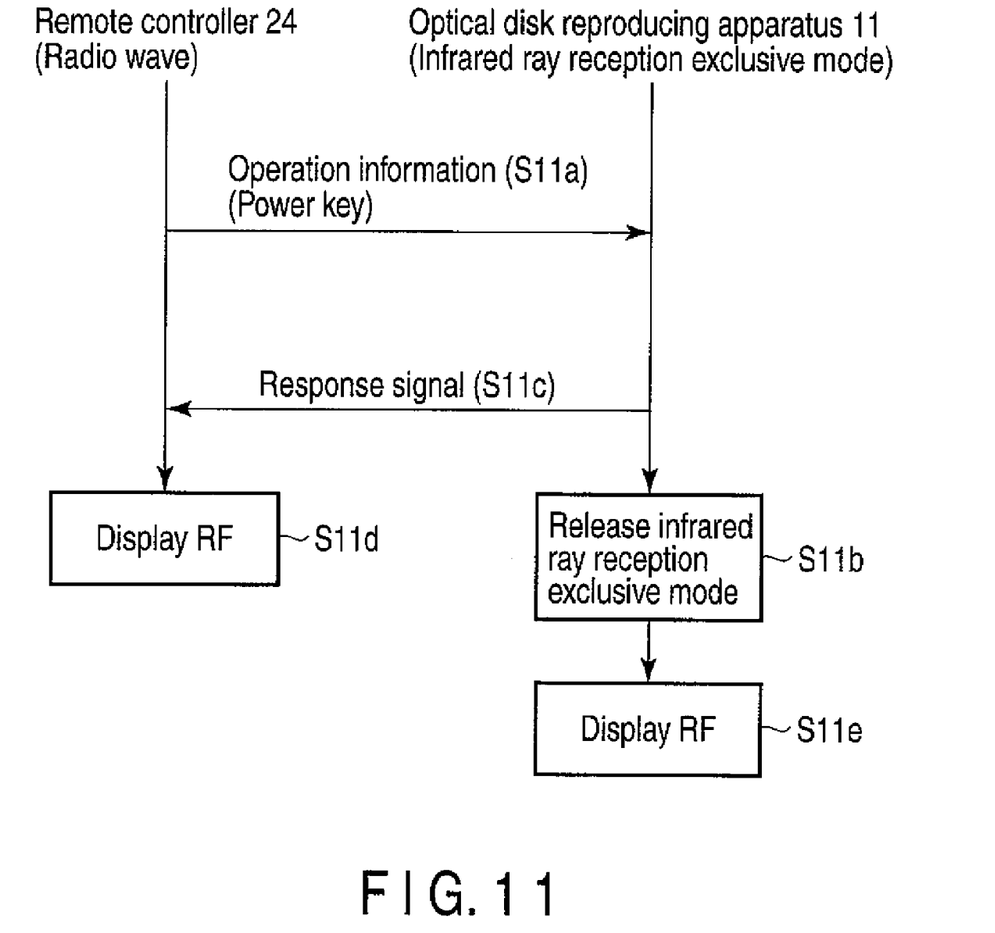
FIG. 11 is a view for explaining a further example of the operation sequence performed by the optical disk reproducing apparatus and the remote controller in the same embodiment.

In that case, as shown in FIG. 11, the operation information, corresponding to the power key is transmitted through radio waves from the remote controller 24, which can transmit the operation information through radio waves, to the optical disk reproducing apparatus 11, set in the infrared ray reception exclusive mode, for not less than 3 seconds (step S11a), whereby the infrared ray reception exclusive mode in the optical disk reproducing apparatus 11 can be released (step S11b).

In the above case, in the optical disk reproducing apparatus 11, a response signal is transmitted to the remote controller 24 through radio waves (step S11c). The response signal shows that the infrared ray reception exclusive mode is released, and the optical disk reproducing apparatus 11 is set in a state capable of accepting the operation information transmitted through radio waves. Accordingly, when the operation information is transmitted through radio waves, the remote controller 24 displays a message "RF" in the liquid crystal display module 24a (step S11d). When the optical disk reproducing apparatus 11 receives the operation information from the remote controller 24 through radio waves (step S11e), the optical disk reproducing apparatus 11 displays the message "RF" in the main body display module 23.

When the operation information transmitted through radio waves is received by the optical disk reproducing apparatus 11 set in the infrared ray reception exclusive mode, a message for releasing the infrared ray reception exclusive mode through radio waves, such as a message "please press the power key of the radio remote controller for not less than 3 seconds", is displayed in the main body display module 23, whereby it is more convenient for users.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio-visual (AV) apparatus comprising:
an infrared ray receiver configured to receive an infrared ray command;
a radio wave receiver configured to receive a radio wave command;
a controller configured to accept at least one of the infrared ray command and the radio wave command, and to control a plurality of modules to a state of corresponding to the accepted command;
a reception controller configured to control the controller to accept the infrared ray command when one of the infrared ray command and the radio wave command is received within a previously set predetermined time from the reception of the other of the infrared ray command and the radio wave command, while the AV apparatus is set in an infrared and radio combination mode in which the infrared ray command and the radio wave command are both accepted; and
a transmitter configured to transmit a response signal via radio waves, the response signal notifying by controlling the reception controller that the infrared ray command is accepted, and the radio wave command is not accepted.

2. An audio-visual (AV) apparatus comprising:
an infrared ray receiver configured to receive an infrared ray command;
a radio wave receiver configured to receive a radio wave command;
a controller configured to accept at least one of the infrared ray command and the radio wave command, and to control a plurality of modules to a state of corresponding to the accepted command;
a reception controller configured to control the controller to accept the infrared ray command when one of the infrared ray command and the radio wave command is received within a previously set predetermined time from the reception of the other of the infrared ray command and the radio wave command, while the AV apparatus is set in an infrared and radio combination mode in which the infrared ray command and the radio wave command are both accepted; and
a remote controller comprising an infrared ray transmitter configured to transmit the infrared ray command and a radio wave transmitter configured to transmit the radio wave command, the remote controller being configured to an infrared and radio combination mode where the infrared ray command and the radio wave command is transmitted, wherein the reception controller is configured to set the previously set predetermined time in such a manner that the previously set predetermined time corresponds to a time difference between a first time of receiving the infrared ray command and a second time of receiving the radio wave command when the remote controller in the combination mode simultaneously transmits the infrared ray command and the radio wave command.

3. An audio-visual (AV) apparatus comprising:

an infrared ray receiver configured to receive an infrared ray command;

a radio wave receiver configured to receive a radio wave command;

a controller configured to accept at least one of the infrared ray command and the radio wave command, and to control a plurality of modules to a state of corresponding to the accepted command;

a reception controller configured to control the controller to accept the infrared ray command when one of the infrared ray command and the radio wave command is received within a previously set predetermined time from the reception of the other of the infrared ray command and the radio wave command, while the AV apparatus is set in an infrared and radio combination mode in which the infrared ray command and the radio wave command are both accepted; and a switch module configured to cancel a radio wave mode in which the AV apparatus is configured to accept only a wave command, based on a predetermined infrared ray command when the AV apparatus is in the radio wave mode, wherein the switch module is configured to display a guidance of switching off the radio wave mode with the predetermined infrared ray command when an infrared ray command is received by the infrared ray receiver when the AV apparatus is in the radio wave mode.

4. An audio-visual (AV) apparatus comprising:

an infrared ray receiver configured to receive an infrared ray command;

a radio wave receiver configured to receive a radio wave command;

a controller configured to accept at least one of the infrared ray command and the radio wave command, and to control a plurality of modules to a state of corresponding to the accepted command;

a reception controller configured to control the controller to accept the infrared ray command when one of the infrared ray command and the radio wave command is received within a previously set predetermined time from the reception of the other of the infrared ray command and the radio wave command, while the AV apparatus is set in an infrared and radio combination mode in which the infrared ray command and the radio wave command are both accepted; and a switch module configured to cancel an infrared ray mode in which the AV apparatus is configured to accept only an infrared ray command, based on a predetermined radio wave command when the AV apparatus is in the infrared ray mode, wherein the switch module is configured to display a guidance of switching off the infrared ray mode with the predetermined radio wave command when a radio wave command is received by the radio wave receiver when the AV apparatus is in the infrared ray mode.

* * * * *